US 12,375,166 B2

(12) United States Patent
Lu et al.

(10) Patent No.: US 12,375,166 B2
(45) Date of Patent: Jul. 29, 2025

(54) SATELLITE COMMUNICATION METHOD AND SYSTEM BASED ON NETWORK CODING AND MODULATED-RETRO REFLECTION

(71) Applicant: TECHNOLOGY AND ENGINEERING CENTER FOR SPACE UTILIZATION, CHINESE ACADEMY OF SCIENCES, Beijing (CN)

(72) Inventors: Lu Lu, Beijing (CN); Pengfei Shen, Beijing (CN); Pengwu Han, Beijing (CN); Yanmei Jia, Beijing (CN); Congmin Lv, Beijing (CN)

(73) Assignee: TECHNOLOGY AND ENGINEERING CENTER FOR SPACE UTILIZATION, CHINESE ACADEMY OF SCIENCES, Beijing (CN)

( * ) Notice: Subject to any disclaimer, the term of this patent is extended or adjusted under 35 U.S.C. 154(b) by 2 days.

(21) Appl. No.: 19/009,789

(22) Filed: Jan. 3, 2025

(65) Prior Publication Data
US 2025/0141537 A1    May 1, 2025

Related U.S. Application Data

(63) Continuation of application No. PCT/CN2023/136279, filed on Dec. 5, 2023.

(30) Foreign Application Priority Data

Dec. 20, 2022    (CN) .......................... 202211643633.5

(51) Int. Cl.
H04B 7/185    (2006.01)

(52) U.S. Cl.
CPC ..... *H04B 7/18526* (2013.01); *H04B 7/18513* (2013.01); *H04B 7/18582* (2013.01); *H04B 7/18584* (2013.01)

(58) Field of Classification Search
CPC ............ H04B 7/18526; H04B 7/18513; H04B 7/18582; H04B 7/18584
See application file for complete search history.

(56) References Cited

U.S. PATENT DOCUMENTS

| 8,065,095 | B2 * | 11/2011 | Rekenthaler | ....... G01N 21/3518 |
| | | | | 702/28 |
| 8,301,032 | B2 * | 10/2012 | Majumdar | ......... H04B 10/1123 |
| | | | | 398/131 |

(Continued)

FOREIGN PATENT DOCUMENTS

| CN | 102938684 A | 2/2013 |
| CN | 108900236 A | 11/2018 |
| CN | 114629546 A | 6/2022 |

*Primary Examiner* — Bailor C Hsu
(74) *Attorney, Agent, or Firm* — Nitin Kaushik

(57) ABSTRACT

The present invention discloses a satellite communication method and system based on network coding and modulated-retro reflection. The method includes: constructing a satellite communication network based on modulated-retro reflection, and constructing, based on the satellite communication network, a plurality of preset basic structures for satellite communication in a preset network coding mode; performing structural splitting on the satellite communication network based on the plurality of preset basic structures to obtain at least one splitting mode including at least one basic satellite network structure, and acquiring, based on the preset network coding mode, a total transmission duration of satellite data transmission for all the preset basic structures in each first splitting mode; and determining a first splitting mode corresponding to a total transmission duration meeting a preset condition as a target splitting mode, and performing (Continued)

satellite data transmission by each preset basic structure corresponding to the target splitting mode.

9 Claims, 15 Drawing Sheets

(56) References Cited

U.S. PATENT DOCUMENTS

| | | | | |
|---|---|---|---|---|
| 9,130,270 B1* | 9/2015 | Nelson | ............... | H01Q 3/267 |
| 9,774,395 B1* | 9/2017 | Goorjian | ............. | H04B 10/118 |
| 10,805,000 B2* | 10/2020 | Black | ................... | H04W 72/23 |
| 2017/0264022 A1* | 9/2017 | Mroczek | ............... | H01Q 15/14 |
| 2024/0235681 A1* | 7/2024 | Lu | ....................... | H04B 10/118 |

* cited by examiner

SATELLITE COMMUNICATION METHOD AND SYSTEM BASED ON NETWORK CODING AND MODULATED-RETRO REFLECTION

CROSS-REFERENCE TO RELATED APPLICATIONS

The application claims priority to Chinese patent application No. 2022116436335, filed on Dec. 20, 2022, the entire contents of which are incorporated herein by reference.

TECHNICAL FIELD

The present invention relates to the technical field of satellite communication, and in particular to a satellite communication method and system based on network coding and modulated-retro reflection.

BACKGROUND

In laser communication, the modulated-retro reflection technique refers to an asymmetric laser communication link, which differs from the traditional laser communication in that a modulated-retro reflector (MRR) only requires pointing, acquisition and tracking (PAT) at one end and a corner reflector or a modulated-retro system having a cat's eye effect at the other end. The modulated-retro reflector has a lower SWaP value than that of a traditional laser communication terminal, and is suitable for use in a microsatellite platform. In a case where two satellites are too far apart to communicate directly, signals can be forwarded by virtue of a relay satellite. The network coding technique, in particular the physical layer network coding (PNC) technique can perform mapping on received superposition signals at a relay node, so as to reduce the communication time of a two-way relay system. It is desired to improve the throughput and other properties of the network with the use of the PNC technique in a satellite network based on MRR.

In the prior art, ① the design is made only for the traditional microwave communication system, and only the ground communication system and the single relay scheme are taken into consideration. ② How to use PNC in a network system with more nodes and the inapplicability to multi-point satellite networking are not considered, and the network layer network coding solution is not considered. ③ The design is made only for the communication protocol in the satellite network using MRR, without the consideration of improving the performance of the network system using the PNC technique.

Therefore, it is urgent to provide a technical solution to solve the above technical problems.

SUMMARY

In order to solve the technical problems described above, the present invention provides a satellite communication method and system based on network coding and modulated-retro reflection.

The technical solution of the satellite communication method based on network coding and modulated-retro reflection according to the present invention includes:
constructing a satellite communication network comprising a plurality of first satellites as a backbone network layer and a plurality of second satellites as a data acquisition layer, and constructing, based on the satellite communication network, a plurality of preset basic structures for satellite communication in a preset network coding mode, wherein any first satellite is provided with a modulated-retro reflector, two transmitters and a receiver, and any second satellite is provided with a modulated-retro reflector and a receiver;

performing structural splitting on the satellite communication network based on the plurality of preset basic structures to obtain at least one splitting mode comprising at least one basic satellite network structure, and acquiring, based on the preset network coding mode, a total transmission duration of satellite data transmission for all the preset basic structures in each first splitting mode, wherein any preset basic structure comprises: at least one relay node, at least two end nodes and a plurality of preset data streams, any end node transmits satellite data by means of a modulated-retro reflector arranged on a satellite corresponding to the end node, any relay node is the first satellite, and any end node is the first or second satellite; and determining a first splitting mode corresponding to a total transmission duration meeting a preset condition, among all the total transmission durations, as a target splitting mode, and performing satellite data transmission by each preset basic structure corresponding to the target splitting mode.

The satellite communication method based on network coding and modulated-retro reflection according to the present invention has the following beneficial effects:
with the use of the network coding and modulated-retro reflection techniques in satellite transmission, the method of the present invention improves the throughput of the satellite communication system by splitting the satellite network structure according to the data stream in the satellite network communication.

On the basis of the solution described above, the satellite communication method based on network coding and modulated-retro reflection according to the present invention can also be improved as follows.

Further, when the preset network coding mode is a physical layer network coding mode, the step of acquiring, based on the preset network coding mode, the total transmission duration of satellite data transmission for all the preset basic structures in each first splitting mode includes:
acquiring, based on the physical layer network coding mode, a first transmission duration of satellite data transmission for each preset basic structure in any first splitting mode, and determining a sum of all first transmission durations corresponding to the first splitting mode, as the total transmission duration of the first splitting mode.

Further, a process of satellite data transmission in the physical layer network coding mode includes:
based on a transmission direction of any data stream, transmitting, simultaneously by means of two end nodes of a preset basic structure corresponding to the preset data stream, satellite data to a relay node of the preset basic structure, to allow the relay node to carry out mapping processing on a superposition value of the satellite data transmitted by the two end nodes to obtain target mapping data, and transmitting the target mapping data to each end node, respectively, to allow each end node to obtain satellite transmission data corresponding to the preset data stream based on the target mapping data and the satellite data transmitted by the end node, wherein a mapping processing mode includes: data XOR processing and data superposition and amplification processing; when the mapping mode is the data XOR processing, the target mapping data are: target XOR data; and when the mapping mode is the data superposition and amplification processing, the target mapping data are: target superposition data.

Further, when the preset network coding mode is a network layer network coding mode, the step of acquiring, based on the preset network coding mode, the total transmission duration of satellite data transmission for all the preset basic structures in each first splitting mode includes:
acquiring, based on the network layer network coding mode, a second transmission duration of satellite data transmission for each preset basic structure in any first splitting mode, and determining a sum of all second transmission durations corresponding to the first splitting mode, as the total transmission duration of the first splitting mode.

Further, a process of satellite data transmission in the network layer network coding mode includes:
based on a transmission direction of any data stream, transmitting, by means of one end node of a preset basic structure corresponding to the preset data stream, first satellite data to a relay node of the preset basic structure; transmitting, by means of the other end node of the preset basic structure, second satellite data to the relay node of the preset basic structure, to allow the relay node to carry out XOR processing on the first satellite data and the second satellite data to obtain first XOR data; and transmitting the first XOR data to the two end nodes of the preset basic structure, respectively, to allow each end node of the preset basic structure to obtain satellite transmission data corresponding to the preset data stream based on the first XOR data and the satellite data of the end node.

Further, the preset condition is that a transmission duration is shortest.

The technical solution of the satellite communication system based on network coding and modulated-retro reflection according to the present invention includes:
a construction module, a processing module and an operation module are included;
the construction module is configured to construct a satellite communication network comprising a plurality of first satellites as a backbone network layer and a plurality of second satellites as a data acquisition layer, and construct, based on the satellite communication network, a plurality of preset basic structures for satellite communication in a preset network coding mode, wherein any first satellite is provided with a modulated-retro reflector, two transmitters and a receiver, and any second satellite is provided with a modulated-retro reflector and a receiver;
the processing module is configured to carry out structural splitting on the satellite communication network based on the plurality of preset basic structures to obtain at least one splitting mode comprising at least one basic satellite network structure, and acquire, based on the preset network coding mode, a total transmission duration of satellite data transmission for all the preset basic structures in each first splitting mode, wherein any preset basic structure comprises: at least one relay node, at least two end nodes and a plurality of preset data streams, any end node transmits satellite data by means of a modulated-retro reflector arranged on a satellite corresponding to the end node, any relay node is the first satellite, and any end node is the first or second satellite; and the operation module is configured to determine a first splitting mode corresponding to a total transmission duration meeting a preset condition, among all the total transmission durations, as a target splitting mode, and carry out satellite data transmission by means of each preset basic structure corresponding to the target splitting mode.

The satellite communication system based on network coding and modulated-retro reflection according to the present invention has the following beneficial effects:
with the use of the network coding and modulated-retro reflection techniques in satellite transmission, the system of the present invention improves the throughput of the satellite communication system by splitting the satellite network structure according to the data stream in the satellite network communication.

On the basis of the solution described above, the satellite communication system based on network coding and modulated-retro reflection according to the present invention can also be improved as follows.

Further, when the preset network coding mode is a physical layer network coding mode, the processing module is specifically configured to:
acquire, based on the physical layer network coding mode, a first transmission duration of satellite data transmission for each preset basic structure in any first splitting mode, and determine a sum of all first transmission durations corresponding to the first splitting mode, as the total transmission duration of the first splitting mode.

Further, a process of satellite data transmission in the physical layer network coding mode includes:
based on a transmission direction of any data stream, transmitting, simultaneously by means of two end nodes of a preset basic structure corresponding to the preset data stream, satellite data to a relay node of the preset basic structure, to allow the relay node to carry out mapping processing on a superposition value of the satellite data transmitted by the two end nodes to obtain target mapping data, and transmitting the target mapping data to each end node, respectively, to allow each end node to obtain satellite transmission data corresponding to the preset data stream based on the target mapping data and the satellite data transmitted by the end node, wherein a mapping processing mode includes: data XOR processing and data superposition and amplification processing; when the mapping mode is the data XOR processing, the target mapping data are: target XOR data; and when the mapping mode is the data superposition and amplification processing, the target mapping data are: target superposition data.

Further, when the preset network coding mode is a network layer network coding mode, the processing module is specifically configured to:
acquire, based on the network layer network coding mode, a second transmission duration of satellite data transmission for each preset basic structure in any first splitting mode, and determine a sum of all second transmission durations corresponding to the first splitting mode, as the total transmission duration of the first splitting mode.

DETAILED DESCRIPTION OF THE EMBODIMENTS

Figure 1:
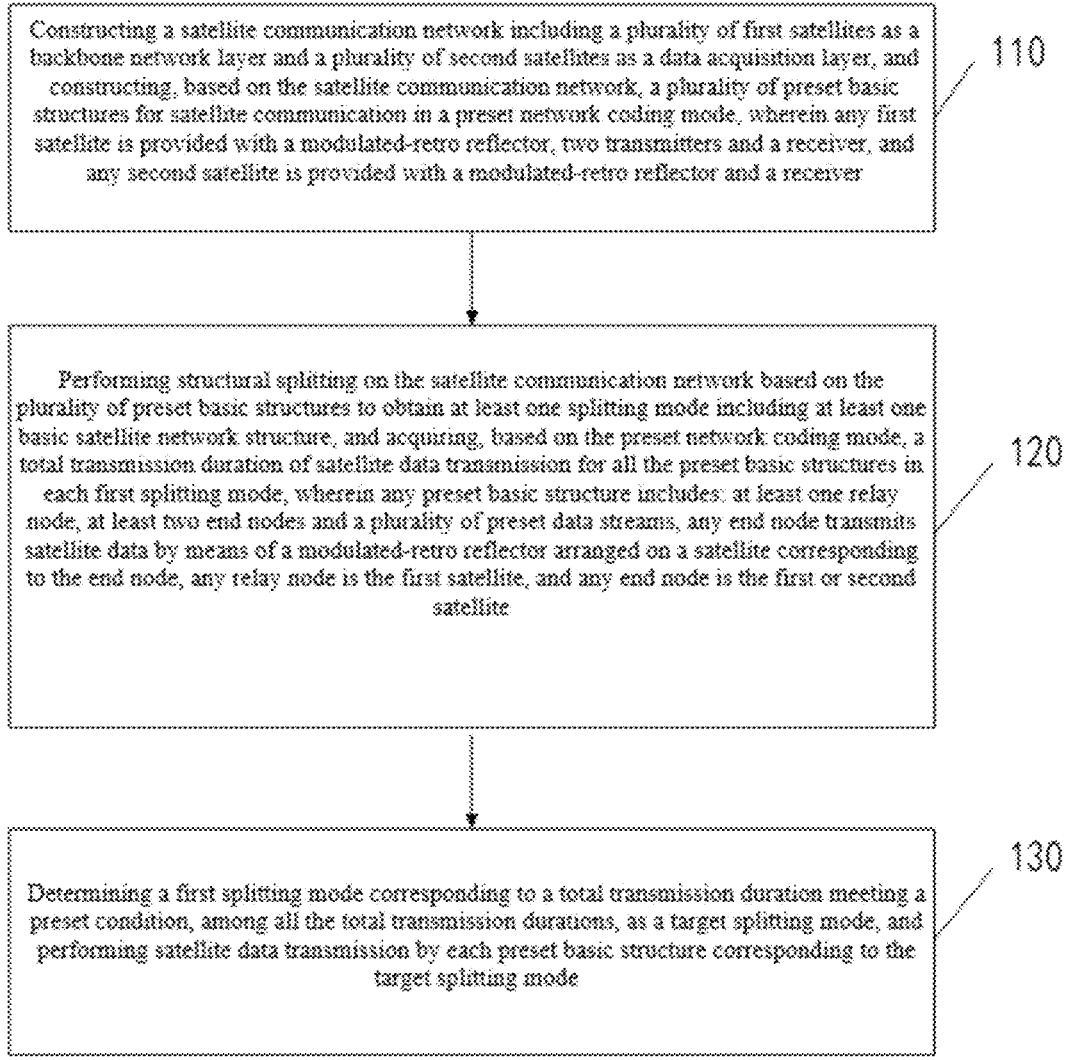
FIG. 1 illustrates a schematic flow chart of an embodiment of a satellite communication method based on network coding and modulated-retro reflection according to the present invention.

FIG. 1 illustrates a schematic flow chart of an embodiment of a satellite communication method based on network coding and modulated-retro reflection according to the present invention. As shown in FIG. 1, the method includes the steps as follows.

In step 110, a satellite communication network including a plurality of first satellites as a backbone network layer and a plurality of second satellites as a data acquisition layer is constructed, and based on the satellite communication network, a plurality of preset basic structures for satellite communication in a preset network coding mode is constructed.

Figure 2:
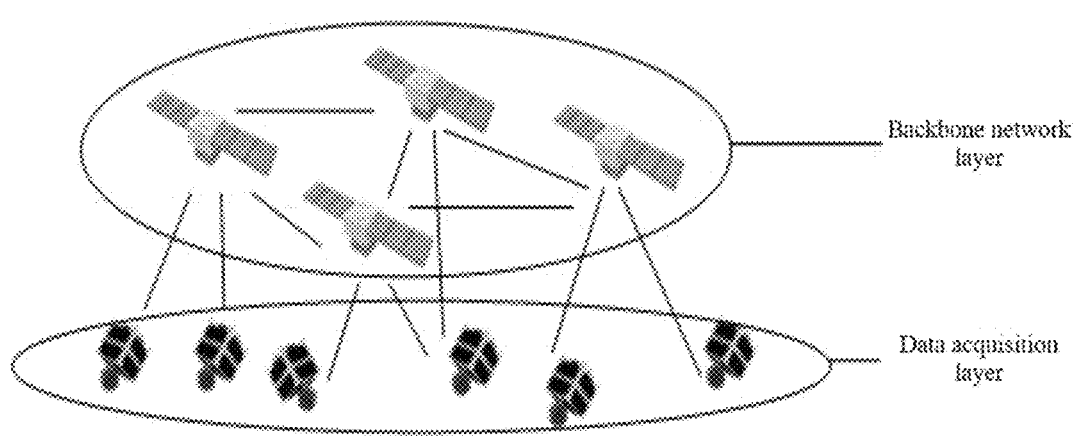
FIG. 2 illustrates a schematic structural diagram of a satellite communication network in an embodiment of a satellite communication method based on network coding and modulated-retro reflection according to the present invention.

① As shown in FIG. 2, the satellite communication network includes: the backbone network layer and the data acquisition layer. ② Any first satellite is provided with a modulated-retro reflector, two transmitters and a receiver, and any second satellite is provided with a modulated-retro reflector and a receiver.

It should be noted that ① each first satellite in the backbone network layer may transmit data to other satellites, or receive data transmitted by other satellites. Due to the two sets of transmitters, each satellite in the backbone network layer may perform data transmission with another two satellites at the same time, such that the physical layer network coding capability is achieved. ② Since each satellite in the data acquisition layer is provided with only one modulated-retro reflector, the satellite does not have the ability to actively transmit data, which must be forwarded by virtue of a satellite in the backbone network layer during the process of satellite communication. ③ Laser communication is used between individual nodes and thus allows for only point-to-point data transmission, instead of broadcasting. ④ Each end node can only communicate with the relay node. For example, if an end node is a satellite in the data acquisition layer, the end node does not have the ability to transmit data actively since it must transmit data passively due to the use of a modulated-retro reflector, and the end node must take advantage of an interrogation beam transmitted by a satellite in the backbone network layer, that is, it can only communicate with a relay node at first. If an end node is a satellite in the backbone network layer, the end node can transmit data actively but cannot directly communicate with other end nodes due to factors such as long distance, and it must take advantage of a relay node to toward the data. ⑤ A plurality of relay nodes may exist during the process of the satellite communication, that is, the data of an end node may be forwarded multiple times to reach an end node at a destination.

In step 120, structural splitting is performed on the satellite communication network based on the plurality of preset basic structures to obtain at least one splitting mode including at least one basic satellite network structure; and based on the preset network coding mode, a total transmission duration of satellite data transmission for all the preset basic structures in each first splitting mode is acquired.

① Any preset basic structure includes: at least one relay node, at least two end nodes and a plurality of preset data streams, and any end node transmits satellite data by means of a modulated-retro reflector arranged on a satellite corresponding to the end node. ② Any relay node is a first satellite, and any end node is a first or second satellite. ③ The preset basic structure has a type including not limited to: a basic satellite network structure consisting of one relay node and two end nodes, a basic satellite network structure consisting of one relay node and three end nodes, a basic satellite network structure consisting of one relay node and four end nodes, a basic satellite network structure consisting of one relay node and five end nodes, and so on. ④ The preset network coding mode includes: a physical layer network coding mode and a network layer network coding mode.

It should be noted that ① the satellite data of any end node may be forwarded by a further node (here, the end node must be a satellite in the backbone network layer). That is, although only one relay forwarding is considered in the basic satellite network structure corresponding to said any end node, the data may in effect pass through a plurality of relay nodes. ② Since each satellite in the backbone network layer is provided with two sets of transmitters and one set of receiver, the following three communication processes may occur: 1) transmitting data to another two satellites at the same time; 2) receiving data from two satellites at the same time (to obtain XOR values of the two satellite data); and 3) performing data transmission and receiving on two satellites respectively (one transmitter transmits data, the other transmitter transmits a interrogation beam, and the receiver acquires corresponding modulated-retro reflection data).

In step 130, a first splitting mode corresponding to a total transmission duration meeting a preset condition, among all the total transmission durations, is determined as a target splitting mode, and satellite data transmission is performed by each preset basic structure corresponding to the target splitting mode.

Here, ① the preset condition is that a transmission duration is shortest. ② The target splitting mode is: a splitting mode with the shortest total transmission duration for satellite transmission.

Preferably, when the preset network coding mode is a physical layer network coding mode, the step of acquiring, based on the preset network coding mode, the total transmission duration of satellite data transmission for all the preset basic structures in each first splitting mode includes:

acquiring, based on the physical layer network coding mode, a first transmission duration of satellite data transmission for each preset basic structure in any first splitting mode, and determining a sum of all first transmission durations corresponding to the first splitting mode, as the total transmission duration of the first splitting mode.

① The process of satellite data transmission in the physical layer network coding mode includes: based on a transmission direction of any data stream, transmitting, simultaneously by means of two end nodes of a preset basic structure corresponding to the preset data stream, satellite data to a relay node of the preset basic structure, to allow the relay node to carry out mapping processing on a superposition value of the satellite data transmitted by the two end nodes to obtain target mapping data, and transmitting the target mapping data to each end node, respectively, to allow each end node to obtain satellite transmission data corresponding to the preset data stream based on the target mapping data and the satellite data transmitted by the end node. A mapping processing mode includes: data XOR processing and data superposition and amplification processing; when the mapping mode is the data XOR processing, the target mapping data are: target XOR data; and when the mapping mode is the data superposition and amplification processing, the target mapping data are: target superposition data. ② The first transmission duration is: the total duration of satellite data transmission by each basic satellite network structure by means of physical layer network coding.

It should be noted that, in addition to the above two modes (data XOR processing or data superposition processing), the mapping process mode of the physical layer network coding mode includes other mapping modes, which will not be described here in detail.

Specifically, the preset basic structures corresponding to the physical layer network coding mode at least have several types as follows (for the several types below, each end node transmits data passively by default, i.e., by means of the interrogation beam, and it may also transmit data actively, which will not be described here in detail).

Figure 3:
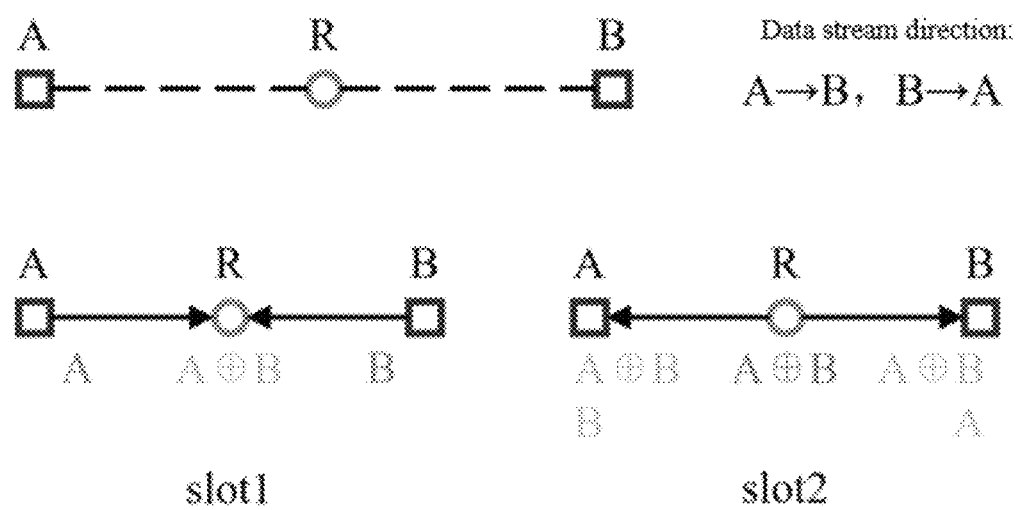
FIG. 3 illustrates a first schematic flow chart of a preset basic structure corresponding to a physical layer network coding mode in an embodiment of a satellite communication method based on network coding and modulated-retro reflection according to the present invention.

① In a case where the preset basic structure consists of one relay node and two end nodes, as shown in FIG. 3, a data stream direction is: A→B and B→A. In FIG. 3, the circle represents the relay node (R), the boxes represent the end nodes (A and B), and the dashed line represents a connection existing between two satellites, i.e., they can directly communicate. In a slot 1, the relay node first transmits interrogation beams to the two end nodes by two sets of transmitters, respectively, and the two end nodes perform data modulation by using the received interrogation beams and reflect beams carrying data back to the relay node. The two reflected beams are naturally superimposed and received by the receiver at the relay node. The relay node demodulates and maps superimposed signals to obtain an XOR value A⊕B of the data of the two end nodes. In a slot 2, the relay node transmits the XOR value obtained in the last slot to the two end nodes by the two sets of transmitters, respectively. After receiving the XOR value, each end node may obtain, based on its own data, the data to be transmitted by the other end node. The data transmission process is completed in the above step, in which two slots (equivalent to two preset durations) are used in total.

It should be noted that if the end nodes A and B are satellites in the data acquisition layer, the interrogation beams of the relay node are needed for transmitting data. If the end nodes A and B are satellites in the backbone network layer, the communication process here is basically consistent with the above process, except that a data transmission mode is changed from passive modulated-retro reflection to active data transmission. Furthermore, the transmitted data may also be forwarded by a further node, and are not necessarily self-produced data. That is, the end node itself in the figure may also be a relay node, and just serves as the end node in this preset basic structure.

Figure 4:
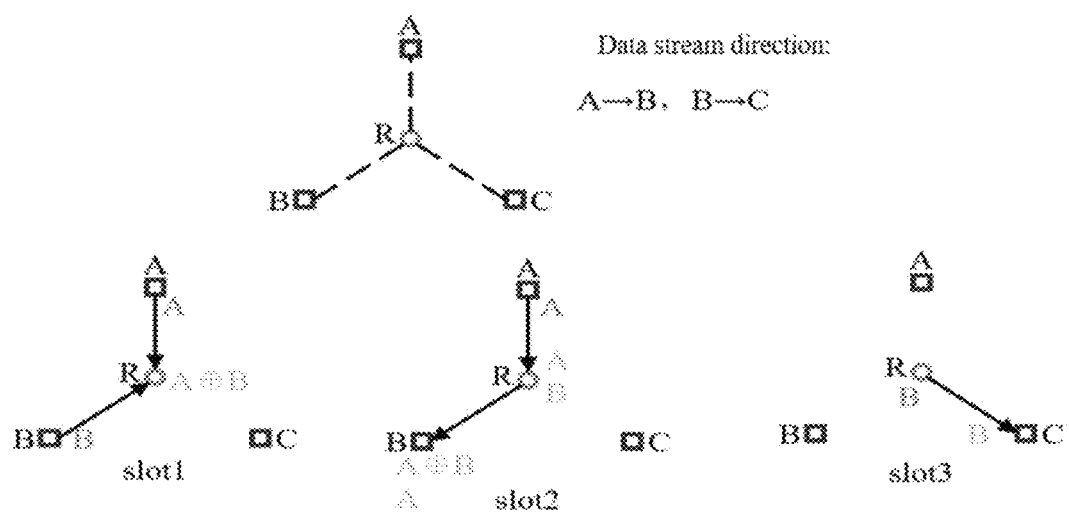
FIG. 4 illustrates a second schematic flow chart of a preset basic structure corresponding to a physical layer network coding mode in an embodiment of a satellite communication method based on network coding and modulated-retro reflection according to the present invention.

② In a case where the preset basic structure consists of one relay node and three end nodes, as shown in FIG. 4, a data stream direction is: A→B and B→C. In FIG. 4, the circle represents the relay node (R), and the boxes represent the end nodes (A, B and C). In a slot 1, the end nodes A and B transmit data A and B to the relay node R by using interrogation beams transmitted by the relay node R, and obtain their XOR value A⊕B at the relay node R. In a slot 2, R transmits A⊕B to B by one transmitter, and transmits an interrogation beam to the node A by the other transmitter and obtains data A; after obtaining the data A, the node R may obtain data B by using A⊕B from the last slot; and after receiving the data A⊕B, the node B may obtain data A by using its own data B. In a slot 3, the node R transmits the data B to C. The data transmission process is completed in the above step, in which three slots (equivalent to three preset durations) are used.

Figure 5:
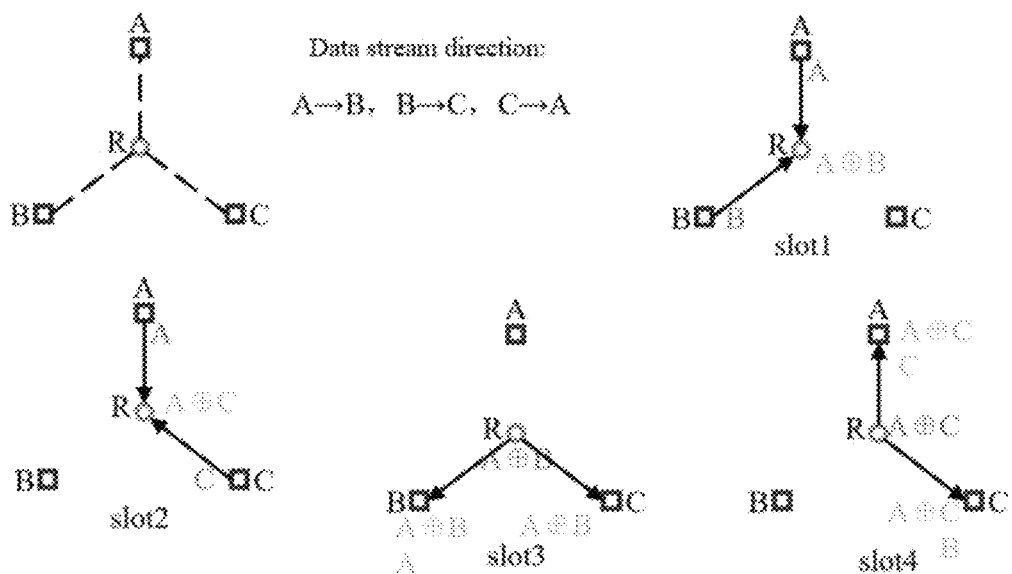
FIG. 5 illustrates a third schematic flow chart of a preset basic structure corresponding to a physical layer network coding mode in an embodiment of a satellite communication method based on network coding and modulated-retro reflection according to the present invention.

③ In addition, as shown in FIG. 5, when the data stream direction is A→B, B→C, and C→A, in a slot 1, the end nodes A and B transmit data A and B to the relay node R by using interrogation beams transmitted by the relay node R, and obtain their XOR value A⊕B at the relay node R. In a slot 2, A and C transmit data A and C to R, and obtain their XOR value A⊕C at R. In a slot 3, R transmits A⊕B to B and C, and after receiving A⊕B, B may obtain the data A by using its own data B. In a slot 4, R transmits A⊕C to A and C; after receiving A⊕C, A may obtain the data C by using its own data A; and after receiving A⊕C, C may obtain the data B by using its own data C and A⊕B from the last slot. The data transmission process is completed in the above step, in which four slots (equivalent to four preset durations) are used.

Figure 6:
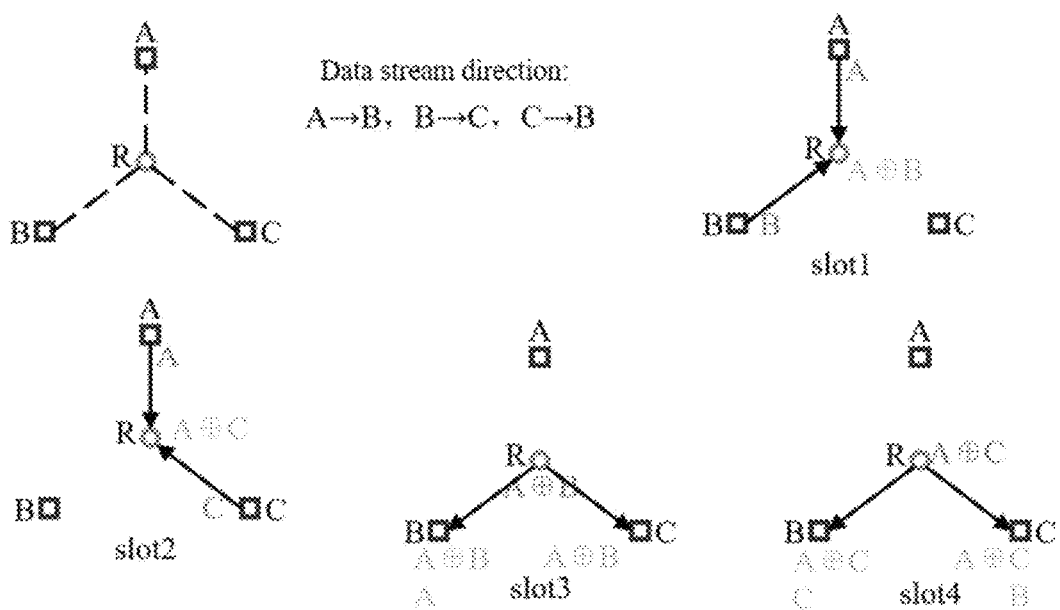
FIG. 6 illustrates a fourth schematic flow chart of a preset basic structure corresponding to a physical layer network coding mode in an embodiment of a satellite communication method based on network coding and modulated-retro reflection according to the present invention.

④ In addition, as shown in FIG. 6, when a data stream direction is A→B, B→C, and C→B, this process is similar to the last process, in which four slots (equivalent to four preset durations) are needed in total.

Figure 7:
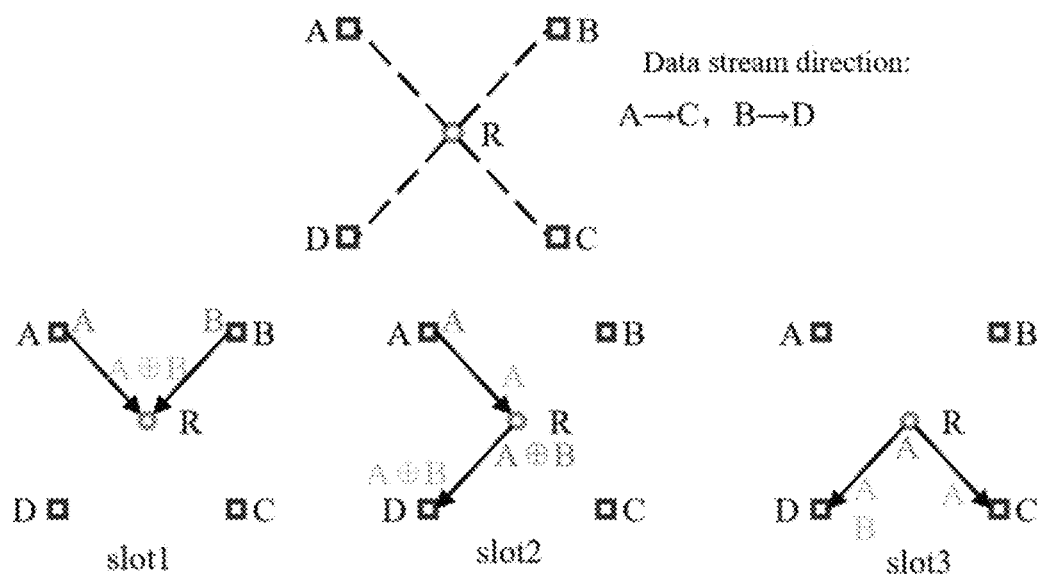
FIG. 7 illustrates a fifth schematic flow chart of a preset basic structure corresponding to a physical layer network coding mode in an embodiment of a satellite communication method based on network coding and modulated-retro reflection according to the present invention.

⑤ In a case where the preset basic structure consists of one relay node and four end nodes, as shown in FIG. 7, a data stream direction is: A→B and B→D. In FIG. 7, the circle represents the relay node (R), and the boxes represent the end nodes (A, B C and D). In a slot 1, the end nodes A and B transmit data A and B to the relay node R by using interrogation beams transmitted by the relay node R, and obtain their XOR value A⊕B at the relay node R. In a slot 2, R transmits A⊕B to D by one transmitter, and transmits an interrogation beam to the node A by the other transmitter and obtains the data A. In a slot 3, the node R transmits the data A to D and C; and after receiving the data A, D may obtain the data B by using A⊕B obtained from the last slot. The data transmission process is completed in the above step, in which three slots (equivalent to three preset durations) are used.

Figure 8:
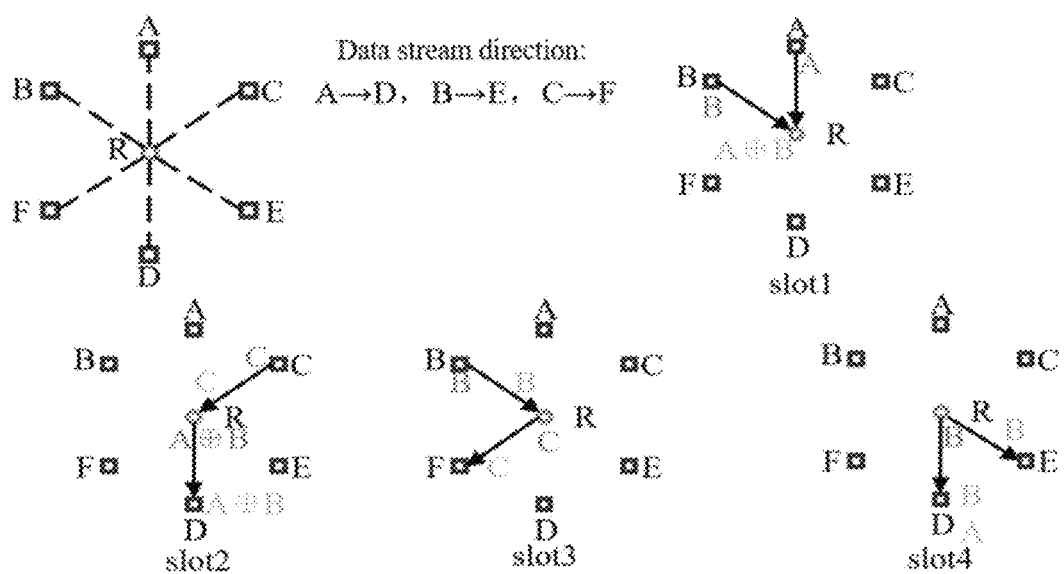
FIG. 8 illustrates a sixth schematic flow chart of a preset basic structure corresponding to a physical layer network coding mode in an embodiment of a satellite communication method based on network coding and modulated-retro reflection according to the present invention.

⑥ In a case where the preset basic structure consists of one relay node and six end nodes, as shown in FIG. 8, a data stream direction is: A→B, B→E, and C→F. In FIG. 8, the circle represents the relay node (R), and the boxes represent the end nodes (A, B, C, D, E and F). In a slot 1, the end nodes A and B transmit data A and B to the relay node R by using interrogation beams transmitted by the relay node R, and obtain their XOR value A⊕B at the relay node R. In a slot 2, R transmits A⊕B to D by one transmitter, and transmits an interrogation beam to the node C by the other transmitter and obtains the data C. In a slot 3, R transmits the data C to F, and transmits an interrogation beam to the node B by the other transmitter and obtains the data B. In a slot 4, the node R transmits the data B to D and E; and after receiving the data B, D may obtain the data A by using A⊕B obtained from the slot 2. The data transmission process is completed in the above step, in which four slots (equivalent to four preset durations) are used.

It should be noted that the preset basic structure corresponding to the physical layer network coding mode is not limited to the six types above, and may occur with a further number of nodes, of which the specific communication process is similar to those of the above six types of basic structures, and the details will not be repeated here.

Figure 9:
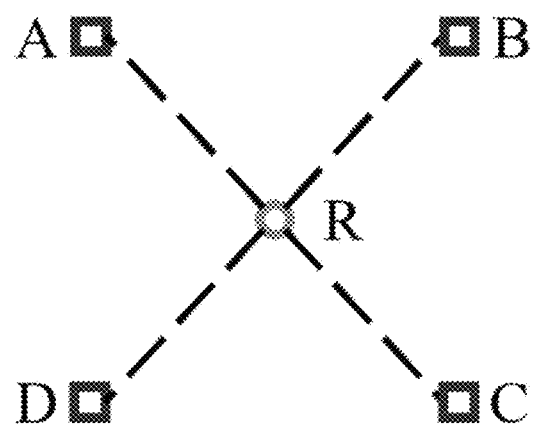
FIG. 9 illustrates a schematic diagram of a first instance corresponding to a physical layer network coding mode in an embodiment of a satellite communication method based on network coding and modulated-retro reflection according to the present invention.
Figure 10:
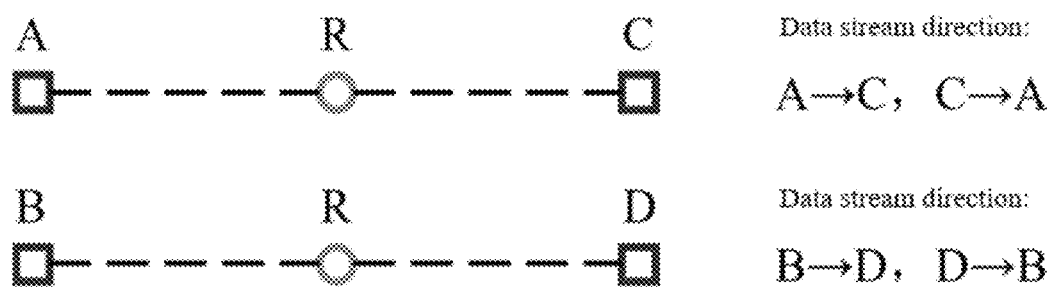
FIG. 10 illustrates a schematic diagram of a second instance corresponding to a physical layer network coding mode in an embodiment of a satellite communication method based on network coding and modulated-retro reflection according to the present invention.

Regarding step 120, the physical layer network coding mode is illustrated by taking the example shown in FIG. 9 and FIG. 10 as an example. FIG. 9 illustrates a five-node satellite communication network, with the dashed line representing a connection existing between two satellites.

Moreover, it is known that the data stream direction in this network is: A→C, C→A, B→D, and D→B (that is, A and C exchange data with each other, and B and D exchange data with each other). This network may be split into two three-node preset basic structures (as shown in FIG. 10), i.e., A-R-C and B-R-D. The data transmission throughout the network may be completed as long as the communication is conducted following the mode in each preset basic structure during data transmission. Regarding the satellite communication network illustrated, a total of 2+2=4 slots are needed to complete the data transmission.

Figure 11:
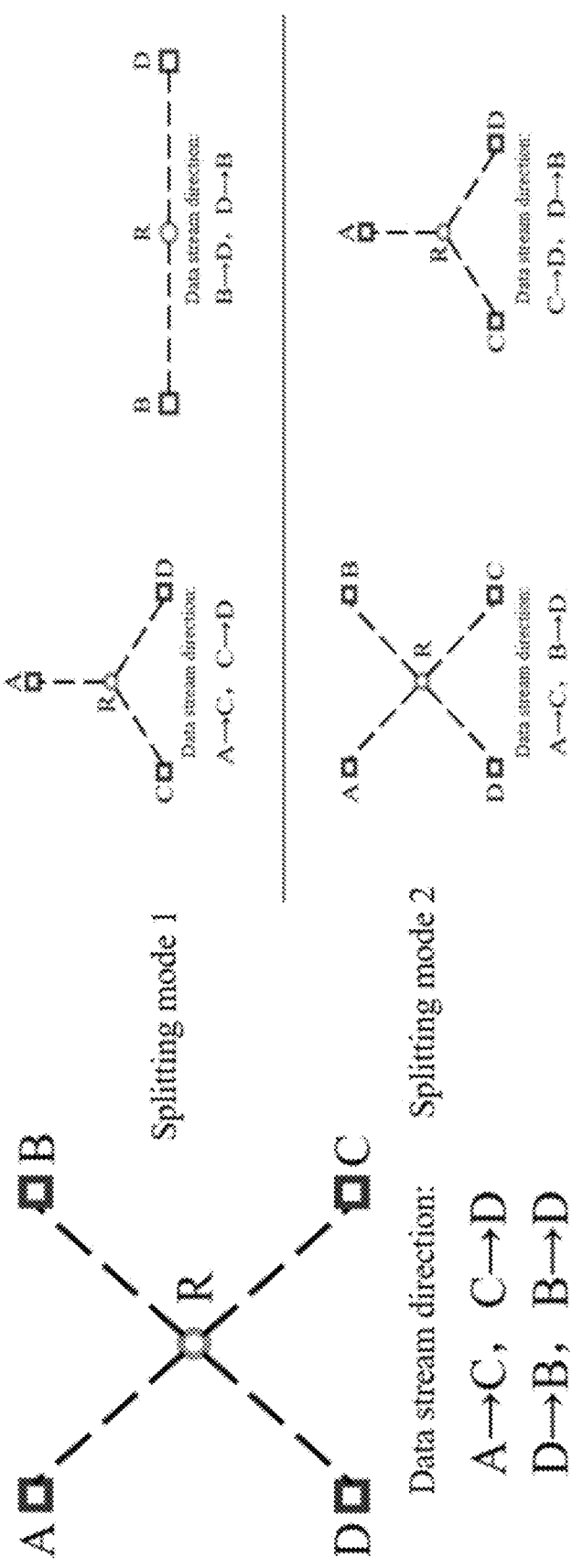
FIG. 11 illustrates a schematic diagram of a third instance corresponding to a physical layer network coding mode in an embodiment of a satellite communication method based on network coding and modulated-retro reflection according to the present invention.

Regarding step 130, the physical layer network coding mode is explained by taking the example shown in FIG. 11 as an example. FIG. 11 illustrates another five-node satellite communication network. It is known that the data stream direction is A→C, C→D, B→D, and D→B. This satellite communication network may be split in two modes, as shown in the figure above. Regarding a splitting mode 1, a total of 3+2=5 slots are needed; and regarding a splitting mode 2, a total of 3+3=6 slots are needed. Therefore, the splitting mode 1 is preferred and should be determined as a target splitting mode.

Preferably, when the preset network coding mode is a network layer network coding mode, the step of acquiring, based on the preset network coding mode, the total transmission duration of satellite data transmission for all the preset basic structures in each first splitting mode includes:

acquiring, based on the network layer network coding mode, a second transmission duration of satellite data transmission for each preset basic structure in any first splitting mode, and determining a sum of all second transmission durations corresponding to the first splitting mode, as the total transmission duration of the first splitting mode.

① The process of satellite data transmission in the network layer network coding mode includes: based on a transmission direction of any data stream, transmitting, by means of one end node of a preset basic structure corresponding to the preset data stream, first satellite data to a relay node of the preset basic structure; transmitting, by means of the other end node of the preset basic structure, second satellite data to the relay node of the preset basic structure, to allow the relay node to carry out XOR processing on the first satellite data and the second satellite data to obtain first XOR data; and transmitting the first XOR data to the two end nodes of the preset basic structure, respectively, to allow each end node of the preset basic structure to obtain satellite transmission data corresponding to the preset data stream based on the first XOR data and the satellite data of the end node. ② The first transmission duration is: the total duration of satellite data transmission by each basic satellite network structure by means of network layer network coding.

Figure 12:
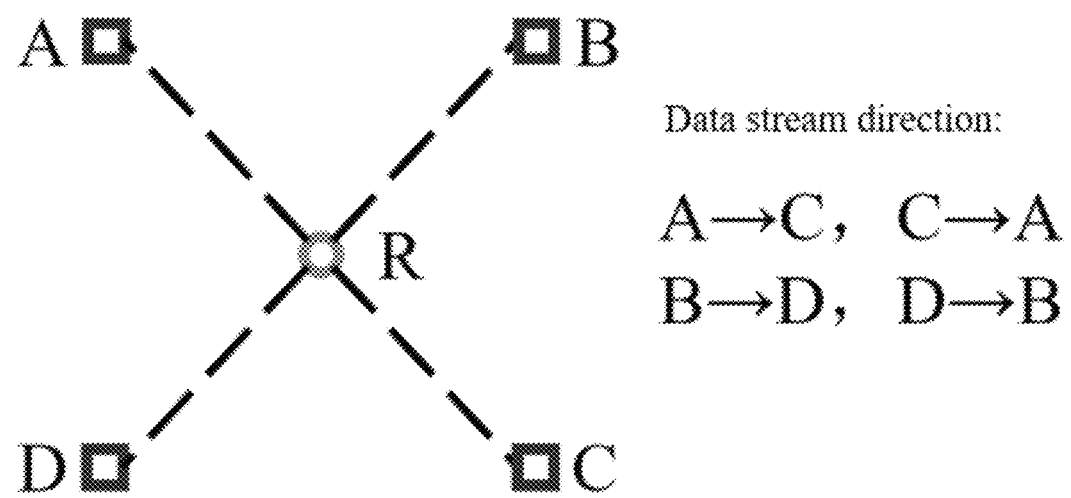
FIG. 12 illustrates a schematic diagram of a first instance corresponding to a network layer network coding mode in an embodiment of a satellite communication method based on network coding and modulated-retro reflection according to the present invention.
Figure 13:
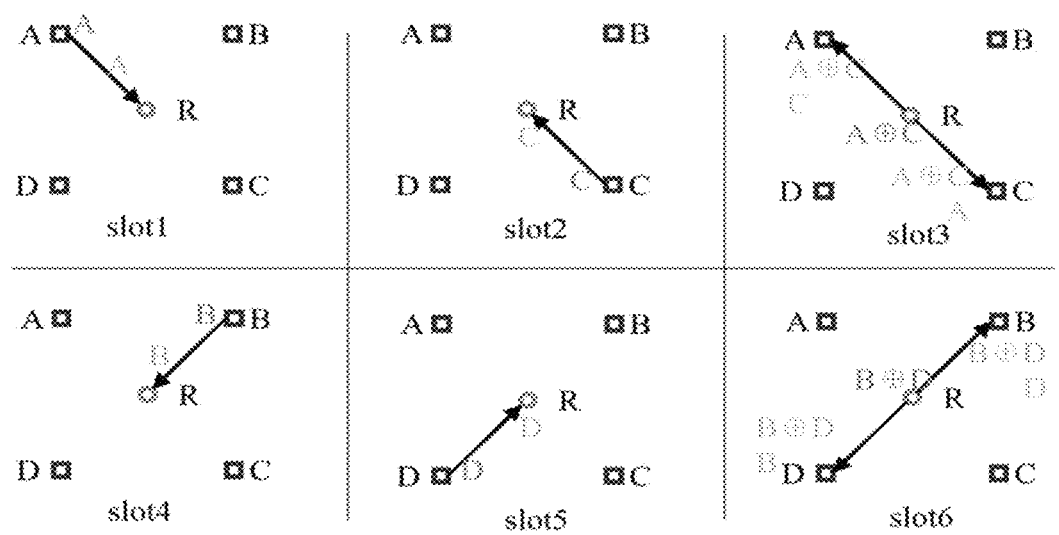
FIG. 13 illustrates a schematic diagram of a second instance corresponding to a network layer network coding mode in an embodiment of a satellite communication method based on network coding and modulated-retro reflection according to the present invention.

Specifically, the network layer network coding mode is illustrated by taking a five-node satellite communication network as an example. As shown in FIG. 12, four end nodes (denoted as A, B, C and D) in a preset basic structure corresponding to the network layer network coding mode require a relay node (denoted as R) for data transmission, and the end nodes may only directly communicate with the relay node. The data stream direction in this preset basic structure is: A→C, C→A, B→D, and D→B (that is, A and C exchange data with each other, and B and D exchange data with each other). In this example, as shown in FIG. 13, the process of satellite data transmission in the network layer network coding mode is as follows.

In a slot 1, the end node A transmits data A to the relay node R by using an interrogation beam transmitted by R. In a slot 2, the end node C transmits data C to the relay node R by using an interrogation beam transmitted by R. After the data A and C are obtained at R respectively, their XOR value A⊕C is obtained. In a slot 3, R transmits A⊕C to A and C; after receiving A⊕C, A may obtain the data C by using its own data A; and after receiving A⊕C, C may obtain the data A by using its own data C. In a slot 4, the end node B transmits data B to the relay node R by using an interrogation beam transmitted by R. In a slot 5, the end node D transmits data D to the relay node R by using an interrogation beam transmitted by R. After the data B and D are obtained at R respectively, their XOR value B⊕D is obtained. In a slot 6, R transmits B⊕D to B and D; after receiving B⊕D, B may obtain the data D by using its own data B; and after receiving B⊕D, D may obtain the data B by using its own data D. The data transmission process is completed in the above step, in which six slots (equivalent to six preset durations) are used.

It should be noted that, in the above example, a total of 6 slots are needed for data transmission in the network layer network coding mode; and only 4 slots are needed in the physical layer network coding mode. However, 8 slots are needed in a case of the traditional point-to-point communication protocol. Therefore, compared with the traditional communication mode, the network layer network coding mode can improve system throughput, with better physical layer network coding solution; and furthermore, the complexity in signal processing is lower since the network layer network coding allows for separate data receiving without processing of signals superimposed at the physical layer.

Figure 14:
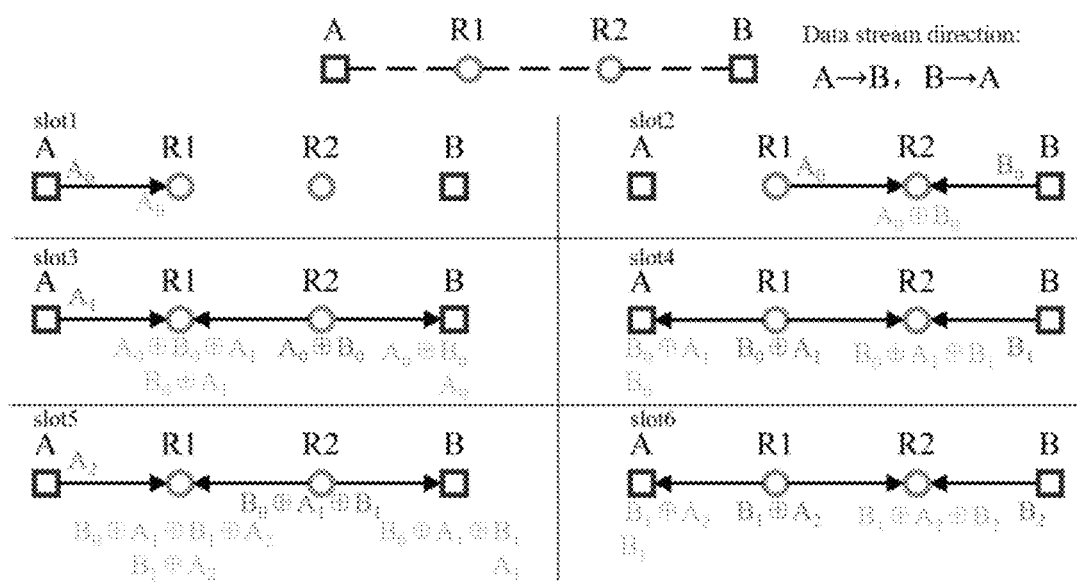
FIG. 14 illustrates a schematic flow chart involving a plurality of relay nodes and corresponding to a physical layer network coding mode in an embodiment of a satellite communication method based on network coding and modulated-retro reflection according to the present invention.

In addition, this embodiment is also applicable to a satellite communication network with a plurality of relay nodes. As shown in FIG. 14 (the physical layer network coding mode), the preset basic structure has a preset data stream of. A→B and B→A. Here, the two end nodes A and B need to exchange data by means of two relay nodes R1 and R2, since the end nodes A and B are both satellites at the data acquisition layer and thus require an interrogation beam transmitted by the relay nodes R1 and R2 for data transmission. There are multiple sets of data to be exchanged between A and B, the data to be transmitted from A to B are denoted as $A_0, A_1, A_2, \ldots$, and the data to be transmitted from B to A are denoted as $B_0, B_1, B_2, \ldots$. The specific communication process is as follows.

In a slot 1, the end node A transmits data $A_0$ to the relay node R1 by using an interrogation beam transmitted by R1. In a slot 2, the end node B transmits data $B_0$ to the relay node R2 by using an interrogation beam transmitted by R2, and R1 transmits $A_0$ to R2. The XOR value $A_0 \oplus B_0$ is obtained at R2. In a slot 3, R2 transmits $A_0 \oplus B_0$ to R1 and B, and meanwhile, the end node A transmits data $A_1$ to R1 by using an interrogation beam transmitted by R1. After receiving $A_0 \oplus B_0$, the end node B obtains $A_0$ by using its own data $B_0$; and the relay node R1 receives $A_0 \oplus B_0 \oplus A_1$, and obtains $B_0 \oplus A_1$ by using the data $A_0$ received in the slot 1. In a slot 4, R1 transmits $B_0 \oplus A_1$ to A and R2, and meanwhile, the end node B transmits the data $B_1$ to R2 by using the interrogation beam transmitted by R2. After receiving $B_0 \oplus A_1$, the end node A obtains $B_0$ by using its own data $A_1$; and the relay node R2 receives $B_0 \oplus A_1 \oplus B_1$. In a slot 5, R2 transmits $B_0 \oplus A_1 \oplus B_1$ to R1 and B, and meanwhile, the end node A transmits data $A_2$ to R1 by using an interrogation beam transmitted by R1. After receiving $B_0 \oplus A_1 \oplus B_1$, the end node B obtains $A_1$ by using its own data $B_0$ and $B_1$; and the relay node R1 receives $B_0 \oplus A_1 \oplus B_1 \oplus A_2$, and obtains $B_1 \oplus A_2$ by using the data $B_0 A_1$ received in the slot 3. In a slot 6, R1 transmits $B_1 \oplus A_2$ to A and R2, and meanwhile, the end node B transmits the data $B_2$ to R2 by using the interrogation beam transmitted by R2. After receiving $B_1 \oplus A_2$, the end node A obtains $B_1$ by using its own data $A_2$; and the relay node R2 receives $B_1 \oplus A_2 \oplus B_2$. The communication processes in the subsequent time slots are similar to those described above and will not be repeated here.

With the use of the network coding and modulated-retro reflection techniques in satellite transmission, the technical solution in this embodiment improves the throughput of the satellite communication system by splitting the satellite network structure according to the data stream in the satellite network communication.

Figure 15:
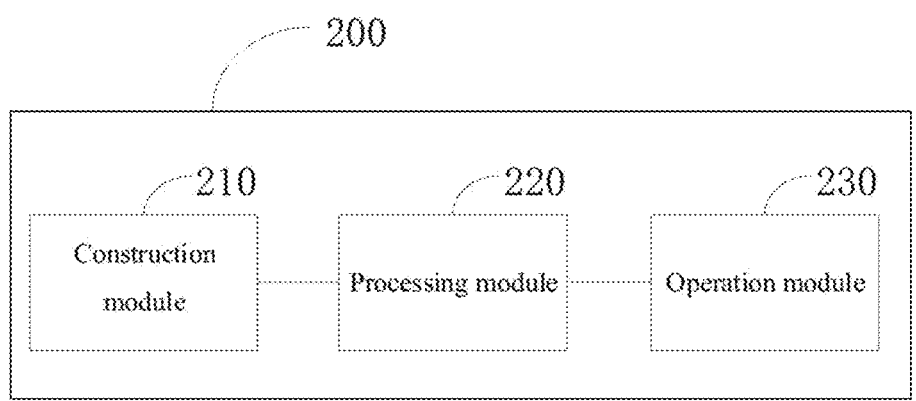
FIG. 15 illustrates a schematic structural diagram of an embodiment of a satellite communication system based on network coding and modulated-retro reflection according to the present invention.

FIG. 15 illustrates a schematic structural diagram of an embodiment of a satellite communication system based on network coding and modulated-retro reflection according to the present invention. As shown in FIG. 15, the system 200 includes a construction module 210, a processing module 220 and an operation module 230.

The construction module 210 is configured to construct a satellite communication network including a plurality of first satellites as a backbone network layer and a plurality of second satellites as a data acquisition layer, and construct, based on the satellite communication network, a plurality of preset basic structures for satellite communication in a preset network coding mode, wherein any first satellite is provided with a modulated-retro reflector, two transmitters and a receiver, and any second satellite is provided with a modulated-retro reflector and a receiver.

The processing module 220 is configured to carry out structural splitting on the satellite communication network based on the plurality of preset basic structures to obtain at least one splitting mode including at least one basic satellite network structure, and acquire, based on the preset network coding mode, a total transmission duration of satellite data transmission for all the preset basic structures in each first splitting mode, wherein any preset basic structure includes: at least one relay node, at least two end nodes and a plurality of preset data streams, any end node transmits satellite data by means of a modulated-retro reflector arranged on a satellite corresponding to the end node, any relay node is the first satellite, and any end node is the first or second satellite.

The operation module 230 is configured to determine a first splitting mode corresponding to a total transmission duration meeting a preset condition, among all the total transmission durations, as a target splitting mode, and carry out satellite data transmission by means of each preset basic structure corresponding to the target splitting mode.

Preferably, when the preset network coding mode is a physical layer network coding mode, the processing module 220 is specifically configured to:

acquire, based on the physical layer network coding mode, a first transmission duration of satellite data transmission for each preset basic structure in any first splitting mode, and determine a sum of all first transmission durations corresponding to the first splitting mode, as the total transmission duration of the first splitting mode.

Preferably, a process of satellite data transmission in the physical layer network coding mode includes:

based on a transmission direction of any data stream, transmitting, simultaneously by means of two end nodes of a preset basic structure corresponding to the preset data stream, satellite data to a relay node of the preset basic structure, to allow the relay node to carry out mapping processing on a superposition value of the satellite data transmitted by the two end nodes to obtain target mapping data, and transmitting the target mapping data to each end node, respectively, to allow each end node to obtain satellite transmission data corresponding to the preset data stream based on the target mapping data and the satellite data transmitted by the end node. Here, a mapping processing mode includes: data XOR processing and data superposition and amplification processing; when the mapping mode is the data XOR processing, the target mapping data are: target XOR data; and when the mapping mode is the data superposition and amplification processing, the target mapping data are: target superposition data.

Preferably, when the preset network coding mode is a network layer network coding mode, the processing module 220 is specifically configured to:

acquire, based on the network layer network coding mode, a second transmission duration of satellite data transmission for each preset basic structure in any first splitting mode, and determine a sum of all second transmission durations corresponding to the first splitting mode, as the total transmission duration of the first splitting mode.

With the use of the network coding and modulated-retro reflection techniques in satellite transmission, the technical solution in this embodiment improves the throughput of the satellite communication system by splitting the satellite network structure according to the data stream in the satellite network communication.

The above-mentioned individual parameters and modules related to the satellite communication system 200 based on network coding and modulated-retro reflection in this embodiment are intended to perform the steps for achieving corresponding functions, a reference can be made to the parameters and steps in the above embodiments related to the satellite communication system based on network coding and modulated-retro reflection, and the details will not be repeated here.

Many details are explained here in the Description provided. However, it can be understood that the embodiments of the present invention can be practices without these specific details. Similarly, to simplify the present invention and help understand one or more aspects of the present invention, the individual features in the embodiments of the present invention are sometimes grouped together into a single embodiment or figure, or their description, in the above description of the exemplary embodiments of the present invention. The claims following the specific embodiments are hereby expressly incorporated into these specific embodiments, where each claim itself serves as a separate embodiment of the present invention.

It should be noted that the above embodiments are intended to explain rather than limiting the present invention, and those skilled in the art can design alternative embodiments without departing from the scope defined by the appended claims. In the claims, any reference sign between brackets should not be construed as limiting the claims. The word "comprise" does not exclude the presence of other elements or steps which are not listed in the claims. The word "one" or "a" preceding an element does not exclude the presence of a plurality of such elements. The present invention can be implemented by means of hardware including several different elements and by means of an appropriately programmed computer. In unit claims listing several means, several of these means may be embodied by the same item of hardware. Use of the words such as "first", "second", "third" and the like does not indicate any ordering, and these words may be interpreted as names. The steps in the embodiments described above should be not understood as limiting the order of execution, unless otherwise specially stated. page intentionally left blank page intentionally left blank

What is claimed is:

1. A satellite communication method based on network coding and modulated-retro reflection, comprising:

constructing a satellite communication network comprising a plurality of first satellites as a backbone network layer and a plurality of second satellites as a data acquisition layer, and constructing, based on the satellite communication network, a plurality of preset basic structures for satellite communication in a preset network coding mode, wherein any first satellite is provided with a modulated-retro reflector, two transmitters and a receiver, and any second satellite is provided with a modulated-retro reflector and a receiver;

performing structural splitting on the satellite communication network based on the plurality of preset basic structures to obtain at least one splitting mode comprising at least one basic satellite network structure, and acquiring, based on the preset network coding mode, a total transmission duration of satellite data transmission for all the preset basic structures in each first splitting mode, wherein any preset basic structure comprises: at least one relay node, at least two end nodes and a plurality of preset data streams, any end node transmits satellite data by means of a modulated-retro reflector arranged on a satellite corresponding to the end node, any relay node is the first satellite, and any end node is the first or second satellite; and determining a first splitting mode corresponding to a total transmission duration meeting a preset condition, among all the total transmission durations, as a target splitting mode, and performing satellite data transmission by each preset basic structure corresponding to the target splitting mode, wherein the preset condition is that a transmission duration is shortest.

2. The satellite communication method based on network coding and modulated-retro reflection according to claim 1, wherein when the preset network coding mode is a physical layer network coding mode, the step of acquiring, based on the preset network coding mode, the total transmission duration of satellite data transmission for all the preset basic structures in each first splitting mode comprises:

acquiring, based on the physical layer network coding mode, a first transmission duration of satellite data transmission for each preset basic structure in any first splitting mode, and determining a sum of all first transmission durations corresponding to the first splitting mode, as the total transmission duration of the first splitting mode.

3. The satellite communication method based on network coding and modulated-retro reflection according to claim 2, wherein a process of satellite data transmission in the physical layer network coding mode comprises:

based on a transmission direction of any data stream, transmitting, simultaneously by means of two end nodes of a preset basic structure corresponding to the preset data stream, satellite data to a relay node of the preset basic structure, to allow the relay node to carry out mapping processing on a superposition value of the satellite data transmitted by the two end nodes to obtain target mapping data, and transmitting the target mapping data to each end node, respectively, to allow each end node to obtain satellite transmission data corresponding to the preset data stream based on the target mapping data and the satellite data transmitted by the end node, wherein a mapping processing mode comprises: data XOR processing or data superposition and amplification processing; when the mapping mode is the data XOR processing, the target mapping data are: target XOR data; and when the mapping mode is the data superposition and amplification processing, the target mapping data are: target superposition data.

4. The satellite communication method based on network coding and modulated-retro reflection according to claim 1, wherein when the preset network coding mode is a network layer network coding mode, the step of acquiring, based on the preset network coding mode, the total transmission duration of satellite data transmission for all the preset basic structures in each first splitting mode comprises:

acquiring, based on the network layer network coding mode, a second transmission duration of satellite data transmission for each preset basic structure in any first splitting mode, and determining a sum of all second transmission durations corresponding to the first splitting mode, as the total transmission duration of the first splitting mode.

5. The satellite communication method based on network coding and modulated-retro reflection according to claim 4, wherein a process of satellite data transmission in the network layer network coding mode comprises:

based on a transmission direction of any data stream, transmitting, by means of one end node of a preset basic structure corresponding to the preset data stream, first satellite data to a relay node of the preset basic structure; transmitting, by means of the other end node of the preset basic structure, second satellite data to the relay node of the preset basic structure, to allow the relay node to carry out XOR processing on the first satellite data and the second satellite data to obtain first XOR data; and transmitting the first XOR data to the two end nodes of the preset basic structure, respectively, to allow each end node of the preset basic structure to obtain satellite transmission data corresponding to the preset data stream based on the first XOR data and the satellite data of the end node.

6. A satellite communication system based on network coding and modulated-retro reflection, comprising: a construction module, a processing module and an operation module, wherein the construction module is configured to construct a satellite communication network comprising a plurality of first satellites as a backbone network layer and a plurality of second satellites as a data acquisition layer, and construct, based on the satellite communication network, a plurality of preset basic structures for satellite communication in a preset network coding mode, wherein any first satellite is provided with a modulated-retro reflector, two transmitters and a receiver, and any second satellite is provided with a modulated-retro reflector and a receiver;

the processing module is configured to carry out structural splitting on the satellite communication network based on the plurality of preset basic structures to obtain at least one splitting mode comprising at least one basic satellite network structure, and acquire, based on the preset network coding mode, a total transmission duration of satellite data transmission for all the preset basic structures in each first splitting mode, wherein any preset basic structure comprises: at least one relay node, at least two end nodes and a plurality of preset data streams, any end node transmits satellite data by means of a modulated-retro reflector arranged on a satellite corresponding to the end node, any relay node is the first satellite, and any end node is the first or second satellite; and the operation module is configured to determine a first splitting mode corresponding to a total transmission duration meeting a preset condition, among all the total transmission durations, as a target splitting mode, and carry out satellite data transmission by means of each preset basic structure corresponding to the target splitting mode, wherein the preset condition is that a transmission duration is shortest.

7. The satellite communication system based on network coding and modulated-retro reflection according to claim 6, wherein when the preset network coding mode is a physical layer network coding mode, the processing module is specifically configured to:

acquire, based on the physical layer network coding mode, a first transmission duration of satellite data transmission for each preset basic structure in any first splitting mode, and determine a sum of all first transmission durations corresponding to the first splitting mode, as the total transmission duration of the first splitting mode.

8. The satellite communication system based on network coding and modulated-retro reflection according to claim 7, wherein a process of satellite data transmission in the physical layer network coding mode comprises:

based on a transmission direction of any data stream, transmitting, simultaneously by means of two end nodes of a preset basic structure corresponding to the preset data stream, satellite data to a relay node of the preset basic structure, to allow the relay node to carry out mapping processing on a superposition value of the satellite data transmitted by the two end nodes to obtain target mapping data, and transmitting the target mapping data to each end node, respectively, to allow each end node to obtain satellite transmission data corresponding to the preset data stream based on the target mapping data and the satellite data transmitted by the end node, wherein a mapping processing mode comprises: data XOR processing or data superposition and amplification processing; when the mapping mode is the data XOR processing, the target mapping data are: target XOR data; and when the mapping mode is the data superposition and amplification processing, the target mapping data are: target superposition data.

9. The satellite communication system based on network coding and modulated-retro reflection according to claim 6, wherein when the preset network coding mode is a network layer network coding mode, the processing module is specifically configured to:

acquire, based on the network layer network coding mode, a second transmission duration of satellite data transmission for each preset basic structure in any first splitting mode, and determine a sum of all second transmission durations corresponding to the first splitting mode, as the total transmission duration of the first splitting mode.

* * * * *